May 19, 1964　　　A. E. CHRISTENSEN　　　3,133,371
ARTIFICIAL FLY
Filed Oct. 31, 1960　　　　　　　　　　　　　2 Sheets-Sheet 1
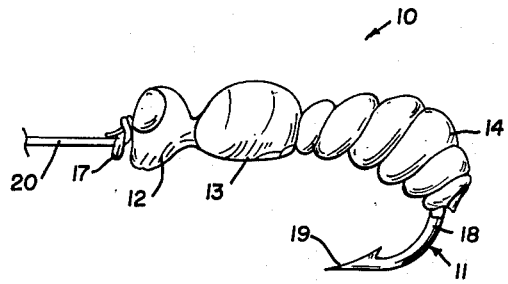
Fig. 1
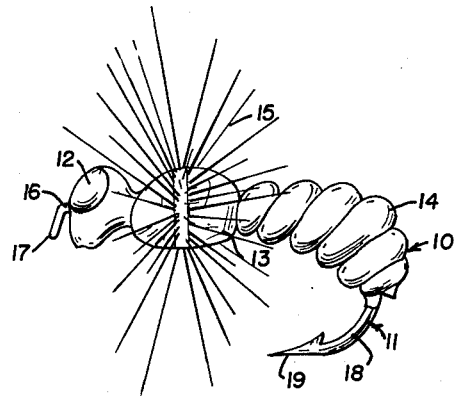
Fig. 2
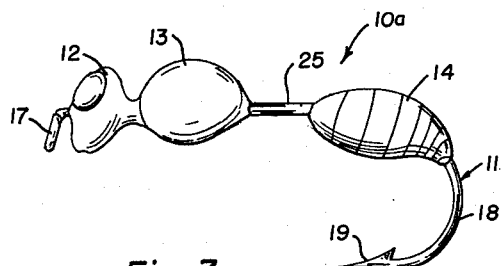
Fig. 3
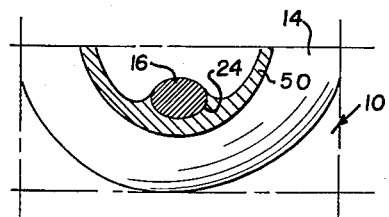
Fig. 6
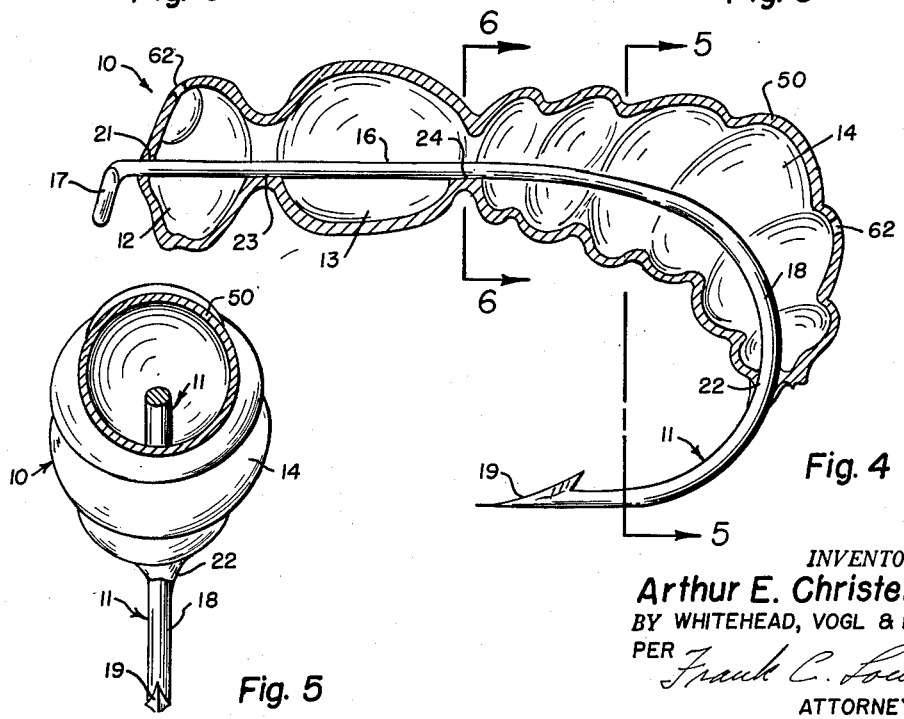
Fig. 4
Fig. 5
INVENTOR.
Arthur E. Christensen
BY WHITEHEAD, VOGL & LOWE
PER *Frank C. Lowe*
ATTORNEYS May 19, 1964     A. E. CHRISTENSEN     3,133,371
ARTIFICIAL FLY Filed Oct. 31, 1960     2 Sheets-Sheet 2

INVENTOR.
Arthur E. Christensen
BY WHITEHEAD, VOGL & LOWE
PER *Frank C. Lowe*
ATTORNEYS though the art of tying flies on small hooks is highly developed, they are not entirely satisfactory since they can, at best, only roughly approximate a true form of an insect body and fish apparently quickly learn to distinguish these artificial flies from their real food whenever fishing activities are at all extensive.

United States Patent Office 3,133,371
Patented May 19, 1964

3,133,371
ARTIFICIAL FLY
Arthur E. Christensen, Rte. 2, Sedalia, Colo.
Filed Oct. 31, 1960, Ser. No. 66,237
3 Claims. (Cl. 43—42.25)

This invention relates to artificial fish lures and more particularly to artificial fish lures of the type which simulates a natural animal and especially an insect. As such, the invention will be hereinafter referred to as an artificial fly, it being understood that such designation is not used in a restrictive sense.

The primary object of the invention is to provide a novel and improved artificial fly having a body formed upon a fishhook which closely imitates and may actually duplicate the body of an insect, or other animal, which the fly represents.

Another object of the invention is to provide a novel and improved artificial fly and an improved body construction therefor, which may be finished to be exceedingly light in weight and capable of floating upon the water surface as a dry fly for an indefinite period of time or which may be finished to be heavier and capable of quickly sinking below the water surface for use as a wet fly.

Another object of the invention is to provide a novel and improved artificial fly having a hollow body construction which may be easily charged with aromatic oils and fluids that are especially attractive to fish, and which will retain such a charge for a substantial period of time.

Yet another object of the invention is to provide in an artificial fly a novel and improved body form incorporating a unique application of metal or metal-like shells bonded to a fishhook to precisely shape the body components of the insect, or animal, the fly represents.

Another object of the invention is to provide a novel and improved artificial fly body appropriately mounted upon a fishhook which may be formed as a finished article or which may be easily finished by a simple wrap of a hackle as about the thorax region of the insect the fly represents to produce a final product which appears to be a natural insect when in the water.

Another object of the invention is to provide a novel and improved method for the manufacture of an artificial fly body upon a hook which produces a shell accurately duplicating the body of a natural insect and which involves simple and easily accomplished steps.

Yet other objects of the invention are to provide a novel and improved artificial fly and improved method for forming the same which is a true replica of a selected insect type, which is neat and trim, which may be comparatively large or very small, and which may be manufactured by simple low-cost operations.

With the foregoing and other objects in view, all of which more fully hereinafter appear, my invention comprises certain novel constructions, combinations and arrangements of parts and elements and improved sequences of operations and steps as hereinafter described, defined in the appended claims and illustrated in preferred embodiments in the accompanying drawing, in which:

FIGURE 1 is a side elevation view of an insect body mounted upon a hook and constructed in accordance with the concepts of my invention.

FIGURE 2 is a side elevation view, similar to FIG. 1 but showing the body as being finished by a hackle tied about the thorax portion of the body.

FIGURE 3 is a side elevation view, similar to FIG. 1 but showing an insect body form having a thin waist and being similar in form to certain types of wasps.

FIGURE 4 is a longitudinal sectional elevational view of the body illustrated at FIG. 1, but on an enlarged scale to better illustrate the interior form of the artificial insect body.

FIGURE 5 is a transverse sectional detail as taken from the indicated line 5—5 at FIG. 4.

FIGURE 6 is a fragmentary sectional detail as taken from the indicated line 6—6 at FIG. 4 but on a further enlarged scale.

Figure 7:
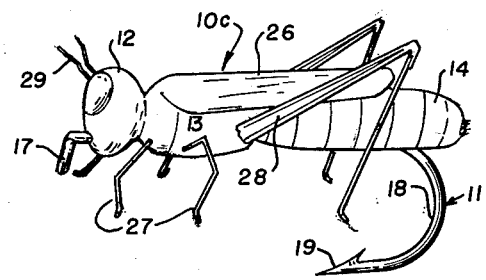
FIGURE 7 is a side elevation view, similar to FIG. 1, but showing an insect body form similar to a grasshopper and including wings folded against the insect body, and also legs and antenna which may be incorporated into the body as hereinafter described.

There has been a number of attempts to supersede the art of tying artificial flys from bits of thread, feathers and hair to obtain more realistic and accurate fly body forms. Some success has been achieved in casting and molding rubber or plastic lures of certain types of compartively large insects but as yet, no satisfactory substitutes have been found for tied flies for small hooks. This is especially true of the small tied flies which are adapted to float, the popular dry flies. However, even though the art of tying flies on small hooks is highly developed, they are not entirely satisfactory since they can, at best, only roughly approximate a true form of an insect body and fish apparently quickly learn to distinguish these artificial flies from their real food whenever fishing activities are at all extensive.

It follows that there is a real and definite need for improved fishing lures and especially in the field of small artificial flies, of the class which is usually less than an inch in length. With such in view, the present invention was conceived and developed, and comprises, in essence, a metallic shell mounted upon a fishhook forming a realistic and accurately depicted insect, and in improved and simplified methods for forming such a body upon a fishhook. It is further contemplated that this fly body will be an excellent lure without further refinement and it may also be suitably finished as by coloring and by the addition of hackles and hairs to simulate wings, legs and the like appendages on the insect.

Referring more particularly to the drawing, the embodiment at FIGS. 1, 2 and 4–6 illustrates an insect body 10 similar to the body of a bee with a hook 11 mounted in this body as hereinafter described. The body 10 includes a head 12, thorax 13 and abdomen 14 and each portion is delineated and contoured according to the natural segmented shape of the insect and is a true likeness of the natural insect. However, this hook-mounted insect body 10 will not ordinarily include legs, antenna or wings although such appendages may be optionally added as hereafter described. Also, if desired, the insect body illustrated at FIG. 1 may be finished by attaching hair or a wrap of hackle 15 about the neck and thorax portion as illustrated at FIG. 2 or it may be finished otherwise according to the desire of a particular fisherman.

The manner of mounting the insect body 10 upon a fishhook 11 is similar to the manner in which a natural insect is ordinarily mounted upon a hook, with the insect being impaled upon the hook shank 16 with the hook eye 17 being at the head of the insect and the hook curve 18 extending from the tip of the abdomen to expose the barbed tip of 19 below the underside of the insect body. This artificial fly will then be attached to a leader or snell 20 by threading the snell onto the eye 17 and knotting it thereover in a conventional manner as illustrated at FIG. 1.

The body 10 is formed as a very thin metallic shell as in a manner hereinafter described. The thickness of this shell will not exceed a few thousandths of an inch and the artificial fly though constructed of metal will be very light. Moreover, the natural form of the insect body will impart a maximum strength to this shell for a given thickness. Also, the hook 11 will be used to reinforce the body. As clearly illustrated at FIG. 4, this metallic shell is bonded to the hook shank 16 at the head point 21 where the shank extends into the insect body and at the abdominal tip 22 where the shank curve 18 extends from the body. The hook shank 16 may also be bonded to other portions inside the insect body as at the neck and waist points 23 and 24 to assure solid contact of the insect body on the hook. Moreover, the hook shank may even be used as a portion of the insect body as where it is desirable to duplicate insects such as ants and thin-waisted wasps. Thus, a body form 10a such as shown at FIG. 3, may include a thin-waist portion 25 to realistically represent the body of a wasp.

Figure 8:
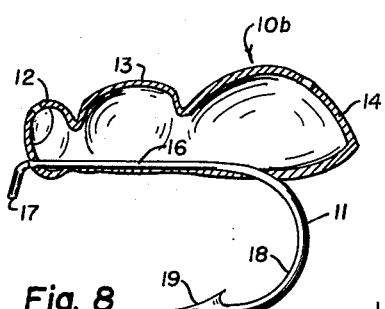
FIGURE 8 is a longitudinal sectional view, similar to FIG. 4 but showing the body of an insect similar to a housefly, and with the hook being positioned along the base of the insect body to provide for maximum clearance of the hook barb and to provide for maximum rigidity of the attachment of the hook to the body.
Figure 9:
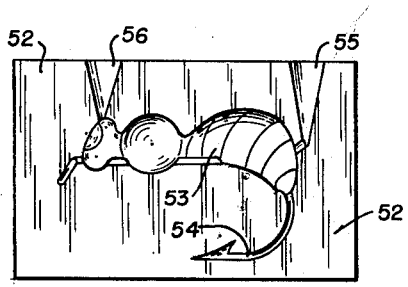
FIGURE 9 is a side elevational view of a half-section of one type of mold which may be used in forming a core of an artificial fly as a preliminary step in the improved method of making an artificial fly.
Figure 10:
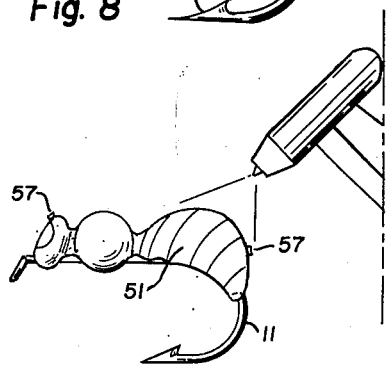
FIGURE 10 is a side elevational view of an artificial fly core obtained from a mold, with spraying upon the core diagrammatically indicating a further step in the process of preparation of the core for forming the fly body.
Figure 11:
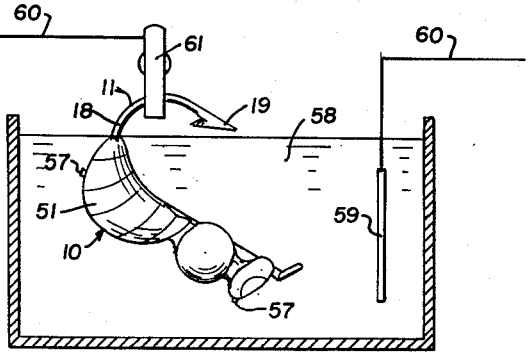
FIGURE 11 is a diagrammatic elevational view of the fly core being immersed into an electrolytic bath, indicative of a further step in the process of preparing the fly body.

The hook shank contact points 23 and 24 within the insect body are at the underside thereof and in forming the body of the insect it is desirable that the hook shank 16 within the body be positioned adjacent to the under edge of the insect body not only to provide for reinforcing points of contact as at 23 and 24 but also to extend the hook curve 18 away from the insect body to better the position of the hook point 19 for snagging into the flesh of a fish and to minimize abuse to the insect body when a large hard-mouthed fish is hooked. Certain types of insects such as beetles and house flies have a comparatively flat and straight under body portion, as at 10b at FIG. 8, and are especially suitable for this purpose. With such insects the entire hook shank 16 may continuously contact the underside of the insect body 10b as illustrated at FIG. 8. Such a construction provides for additional rigidity and is especially preferred where the hooks and flies thereon are quite small.

A number of modifications to the basic construction hereinbefore described are possible, using the same insect body form. While the more common construction of my invention will consist of an insect body upon a hook which is devoid of appendages such as legs, wings and antenna, these appendages may be included. In certain types of insects which have their wings normally folded against the body, the wings may be included as part of the shell. The grasshopper-like insect body 10c of FIG. 7 delineates wings 26 as being folded against the body form and being part of the body form. Insects of this type include grasshoppers and beetles and the wings 26 of the grasshopper-like body 10c may be realistically formed in their folded position to truly duplicate the insect. Also, as illustrated at FIG. 7, both the forelegs 27, the back legs 28 and the antenna 29 of this type of insect may be affixed to the metallic shell forming the insect body. These legs are preferably small diameter metallic wires or small plastic rods or the like and are affixed to the shell of the insect body when it is formed, as hereinafter described.

The metallic shell of this insect body is easily formed by an electroplating operation, by the deposit of thin metal layer 50 upon a core 51 which has the proper insect form and has a hook 11 properly imbedded within it. This shell forming layer may be of copper, cadmium or chrome or any similar metal which will plate to form a rigid metallic skin against a base or in this case the core 51, which has proper conductive properties to pass an electric current.

The art of electroplating various objects is highly developed and it is well within the skill of many technicians to select various metals to form a metallic skin against a core. In electroplating objects of various size and of the size hereinafter contemplated, the proper solutions, voltages and current density are easily determined by a skilled plater. Therefore, the details of any particular electroplating operation need not be disclosed herein and electroplating as such merely constitutes one of several steps in the methods of manufacturing an artificial fly as now disclosed.

As a first step in the manufacture of the improved artificial fly, a core 51 is shaped to the form of an insect body for reasons hereinafter set forth. This core is preferably, but not necessarily of wax material which will easily melt. However, the core may also be of a metal having a low melting temperature such as Wood's metal or Rose's metal.

Once a given type of insect body is selected for mounting upon a properly sized fishhook, a core mold 52 is prepared. A half of this mold is illustrated at FIG. 8 which is diagrammatical in nature representative of one part of a simple two-piece mold having a half cavity 53 of the insect and a half-hook cavity 54 adapted to hold a hook in the proper position when set in the mold. Actually the mold may be any other suitable type and in any event it will include a sprue 55 and a vent 56 or equivalent passageways to permit casting of the core 51. In production, a gang mold of rubber or the like may be used to permit the casting of a large number of insect bodies at one time.

After placing a hook 11 in the mold and casting a core 51 forming the insect body about the hook, any flashing on the core is removed and the sprue and vent cones of material will be cut off leaving short nubs 57 which project above the surface of the insect body. If the core is of a nonconductive material such as wax, the next step is to render the surface conductive. It may be sprayed with a conductive paint such as a graphite-carrying lacquer or it may be surfaced with a graphite-like material. Such materials are well known to the art.

In final use of this artificial fly it may be desirable to remove the core 51 to make the fly a dry fly and as light as possible, or it may be desirable to keep the core to make the fly sink as where it is to be used as a wet fly. In the preparation for a dry fly, the ends of the nubs 57 may be cleaned of the conductive material to prevent electroplating deposits at these nubs to form drain orifices through the shell. On the other hand, for a wet fly, the nubs 57 may be completely removed.

Figures 12, 14:
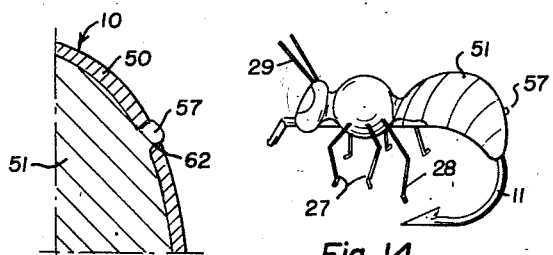
FIGURE 12 is a fragmentary sectional detail of a portion of a completed fly body and core therein, with a tip of the core suitably projecting through the fly body to form an orifice therein.
FIGURE 14 is a side elevational view, similar to FIG. 10, illustrating a fly core further modified in an optional manner by inserting short lengths of wire into the core to form realistic appendages on the insect body.

As a next, optional, step in the preparation of the core forming the insect, appendages may be added to the core. These appendages, such as the legs 27 and 28 of the insect 10c, need be nothing more than bits of small diameter wire or strands or rods of plastic material which are suitably shaped to represent the selected appendage. This wire or rod material may be easily inserted into a wax core to remain in its proper position, as generally illustrated at FIG. 14, until the electroplating operation is completed. If wire is used the electroplating operation will deposit a thin layer or metallic shell upon the wires, the same as upon the body of the core but if non-conductive, plastic material is used such a deposit will not occur.

The electroplating operation will be consummated in a bath 58 of a suitable electrolyte with the core 51 forming one of the electrodes and with a conventional electrode 59 opposing the core. Current is obtained as by diagrammatically indicated wire 60 from an electrical power source. The core 51 is completely submerged into the bath 58 and is held by a clip 61 affixed to the end curve 18 of the hook with the curve 18 and point of the hook remaining out of the bath. When a shell of suitable thickness is formed as the result of a single or of a sequential plating operation the completed fly body is removed from the bath.

Figure 13:
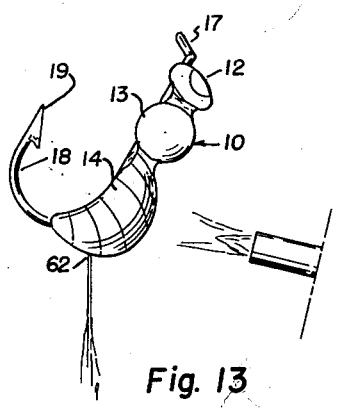
FIGURE 13 is a side elevational view of a completed artificial fly, diagrammatically indicating one manner of removing core material as a further optional step in the manufacture of the artificial fly.

A further optional subsequent step is the removal of the core 51 from the body shell 50. When this core is to be removed the ends of the nubs 57 are rendered nonconductive so that no plating will deposit upon them, as illustrated at FIG. 12. These nubs accordingly form drain orifices 62 in the fly body and the core may be removed by merely heating it to a temperature suitable to melt the wax or other low temperature metal. This melted wax will run out of an opening 62 as illustrated at FIG. 13. The openings 62 may finally be closed as by a small drop of paint or they may be allowed to remain on the insect body.

Further operation to complete the fly will consist in any desirable additions such as painting the body a selected color, adding hackles or the like. The artificial fly as thus formed is a simple insect body with or without being modified as in any of the several manners hereinbefore described, provides for a simple, neat-appearing fishing lure especially effective in catching fish.

While I have thus described my invention in considerable detail, it is nevertheless obvious that others skilled in the art can devise and build alternate and equivalent constructions which are within the spirit and scope of my invention. Hence, I desire that my protection extend, not to the constructions illustrated and described, but only by the proper scope of the appended claims.

I claim:

1. A fish lure comprising a fish hook having a shank portion, and a relatively small hollow body simulating an insect or the like impaled upon said shank portion of said fish hook, the form retaining portion of said hollow body consisting of only a thin hollow self-sustaining metallic electroplate deposit of a few thousandths of an inch formed by deposition on a removable core, said deposit constituting a rigid shell, said shell being bonded to said shank portion by electroplate bond at the points where said shank portion intersects said shell.

2. The fish lure defined in claim 1, wherein the body includes two portions to form a thin-waisted wasp-type insect and wherein the intermediate waist portion of the insect between the body portions consists of a section of the shank of said fish hook.

3. The fish lure defined in claim 1 including non-metallic appendages extending through said shell to represent legs and the like.

References Cited in the file of this patent

UNITED STATES PATENTS

| | | |
|---|---|---|
| 789,342 | Voelke | May 9, 1905 |
| 2,106,755 | McArthur | Feb. 1, 1938 |
| 2,217,677 | George | Oct. 15, 1940 |
| 2,242,708 | Lancaster | May 20, 1941 |
| 2,500,494 | Jeffers | Mar. 14, 1950 |
| 2,551,221 | Pray | May 1, 1951 |
| 2,643,418 | Auldridge | June 30, 1953 |
| 2,781,604 | Brown | Feb. 19, 1957 |
| 2,924,906 | Lindquist | Feb. 16, 1960 |
| 2,938,294 | Bachmann | May 31, 1960 |

FOREIGN PATENTS

| | | |
|---|---|---|
| 21,499 | Great Britain | Oct. 6, 1903 |